(12) United States Patent
Hosotani et al.

(10) Patent No.: US 6,469,913 B2
(45) Date of Patent: Oct. 22, 2002

(54) SWITCHING POWER SUPPLY DEVICE HAVING SERIES CAPACITANCE

(75) Inventors: Tatsuya Hosotani; Hiroshi Takemura, both of Muko; Yasuji Okamoto, Nishinomiya, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/957,976

(22) Filed: Sep. 21, 2001

(65) Prior Publication Data

US 2002/0101742 A1 Aug. 1, 2002

(30) Foreign Application Priority Data

Sep. 27, 2000 (JP) ........................................ 2000-295203

(51) Int. Cl.$^7$ ............................................. H02M 3/335
(52) U.S. Cl. ........................................................ 363/16
(58) Field of Search ............................. 363/16, 97, 131, 363/22, 21.01, 21.02, 23

(56) References Cited

U.S. PATENT DOCUMENTS 5,570,278 A * 10/1996 Cross ........................... 363/131
5,946,206 A    8/1999 Shimizu et al.
6,061,252 A    5/2000 Hosotani

FOREIGN PATENT DOCUMENTS

| EP | 05328719 | 12/1993 |
|----|----------|---------|
| EP | 10225122 | 8/1998 |
| EP | 11136940 | 5/1999 |
| EP | 11285249 | 10/1999 |
| EP | 2000209857 | 7/2000 |
| JP | 5328719 | 12/1993 |
| JP | 1187664 | 7/1999 |

* cited by examiner

Primary Examiner—Shawn Riley
(74) Attorney, Agent, or Firm—Ostrolenk, Faber, Gerb & Soffen, LLP

(57) ABSTRACT

A switching power supply device that can reduce switching loss to obtain high efficiency. Additionally, the number of components of control circuits and the cost of switching elements can be reduced, with a transformer made compact and lightweight. In this switching power supply device, one end of a series circuit comprising a primary winding of the transformer, an inductor, and a capacitor is connected to a junction of a first switching circuit and a second switching circuit. The other end of the series circuit is connected to an input power source. A secondary winding of the transformer is connected to a rectifying and smoothing circuit including a rectifying element. In addition, in order to perform a self-excited oscillation, there are arranged first and second control circuits. The first control circuit controls a time elapsing until the first switching circuit turns on after the generation of a voltage in a first driving winding of the transformer and a time elapsing until the first switching circuit turns off. Similarly, the second control circuit controls a time elapsing from the generation of a voltage in a second driving winding of the transformer to the turn-on of the second switching circuit and a time elapsing until the second switching circuit turns off.

21 Claims, 8 Drawing Sheets

SWITCHING POWER SUPPLY DEVICE HAVING SERIES CAPACITANCE

BACKGROUND OF THE INVENTION

1. Field of the Invention

The present invention relates to switching power supply devices for supplying DC stabilizing voltages. More particularly, the invention relates to switching power supply devices storing energy in the primary winding of a transformer and a capacitor during the ON-periods of a switching element and supplying the stored energy to a load from the secondary winding of the transformer during the OFF-periods of the switching element.

2. Description of the Related Art

In Japanese Patent Application No. 9-352696, there is provided a switching power supply device, in which a first switching circuit is connected to a second switching circuit on the primary winding side of a transformer T and switching control circuits alternately turn on and off switching elements included in the first and second switching circuits before and after periods during which both switching elements are turned off so that a self-excited oscillation is performed. FIG. 1 is a block diagram illustrating the switching power supply device.

In this switching power supply device, an input power source E, an inductor L, and a first switching circuit S1 are connected in series to a primary winding T1 of a transformer T. Additionally, a series circuit composed of the primary winding T1 and the inductor L is connected in parallel to a series circuit composed of a capacitor C and a second switching circuit S2. A first driving winding T3 generates a voltage substantially proportional to a voltage of the primary winding T1. The voltage of the first driving winding T3 is input to a control circuit 11. Similarly, a second driving winding T4 generates a voltage substantially proportional to a voltage of the primary winding T1. The voltage of the second driving winding T4 is input to a control circuit 12. The voltage of the control circuit 11 is input to a control terminal of a first switching element Q1 of the first switching circuit S1. The voltage of the second control circuit 12 is input to a control terminal of a second switching element Q2 of the second switching element S2. The first switching circuit S1 is formed by a parallel connection circuit composed of the first switching element Q1, a first diode D1, and a first capacitor C1. The second switching circuit S2 is formed by a parallel connection circuit composed of the second switching element Q2, a second diode D2, and a second capacitor C2.

A rectifying element Ds is connected in series to the secondary winding T2 of the transformer T. A rectifying and smoothing circuit is composed of the rectifying element Ds and a capacitor Co connected to an output of the rectifying element Ds. The rectifying element Ds is connected in parallel to a capacitor (capacitive impedance) Cs. A detection circuit 14 detecting the voltage of a load is connected between an output of the rectifying and smoothing circuit and the load. An output feedback of the detection circuit 14 is sent to the first control circuit 11.

In addition. U.S. Pat. No. 3,596,165 provides a switching power supply device, in which two switching circuits are connected to each other on the primary winding side of a transformer to perform separately-excited oscillation and a fullwave rectifier is connected to the secondary winding.

Furthermore, in Japanese Unexamined Patent Application Publication No. 5-328719 and Japanese Unexamined Patent Application Publication No. 11-136940, there are provided switching power supply devices. In each of the devices, two switching circuits are connected to each other on the primary winding of a transformer and a secondary-side winding is formed by a circuit structure as shown in FIG. 1. In this case, an inductor and a capacitor are connected in series to the primary winding. A second switching element is connected in parallel to the series circuit.

In each of the switching power supply devices above, however, there are problems as follows.

(1) U.S. Pat. No. 3,596,165

The switching power supply device is a circuit referred to as a resonant-type half-bridge circuit (ON-ON type). In this type of circuit, when each switching element is turned on. energy is transmitted from the primary winding to the secondary winding. The ON-time of each of the switching elements is substantially fixed and the switching frequency is changed to change the impedance of an LC resonant circuit connected in series to the primary winding so as to control an output power. In other words, when the LC resonant frequency and the switching frequency are close to each other, the impedance of the LC resonant circuit becomes smaller. whereby a large current flows through the transformer. so that a large output power can be obtained. In contrast, when the LC resonant frequency is far from the switching frequency, a small output power can be obtained. In such an arrangement, according to the output power, the switching frequency changes significantly. When the frequency greatly changes, the dimensions of an output smoothing circuit and a filter circuit also increase. As a result, there are problems such as interference with electronic components and increase in loss in the control circuits.

Additionally, since the switching power supply device is a separately excited oscillation type of device, the number of components increases, which hinders miniaturization of the device and cost reduction. Furthermore, in order to perform full-wave rectification, at least two diodes are required on the secondary side of the transformer.

(2) Japanese Unexamined Patent Application Publication No. 5-328719 and Japanese Unexamined Patent Application Publication No. 11-136940

Each of the switching power supply devices provided in the publications is an ON-OFF type switching power supply device in which energy is stored in the primary winding during the ON-times of switching elements and the stored energy is discharged from the secondary winding during the OFF-times of the switching elements. However, each of the devices is not a self-excited oscillation type but a separately excited oscillation type or a synchronous oscillation type. Thus, since the device requires an oscillator, a drive circuit, and the like, the number of components increases, thereby hindering miniaturization of the device and cost reduction. In Japanese Unexamined Patent Application Publication No. 5-328719, since a synchronous oscillation circuit is used, an oscillator is not required. Nevertheless, the power supply device needs an IC including a MOS-FET having high voltage breakdown properties to drive a high-side switching element. a pulse transformer for isolation and drive, and so on. As a result, in even the switching power supply device, the size of the switching control circuit and production cost increase.

(3) Japanese Patent Application No. 9-352696

The switching power supply device provided in this publication is a self-excited oscillation type, which is an ON-OFF type switching power supply device storing energy in the primary winding during the ON-time of a first switching circuit and discharging the stored energy from the secondary winding during the OFF-period of the first switching circuit. As shown in FIG. 1, since a voltage equivalent to the sum of an input voltage Vin and a capacitor voltage Vc is applied to a switching element, the switching element needs to be an element having high voltage breakdown properties. In addition, since the power supply device has a structure in which the input voltage Vin is directly applied to the primary winding T1 of a transformer T, the voltage applied to the primary winding T1 becomes higher, which hinders miniaturization of the device.

Furthermore, only excitation energy stored in the primary winding of the transformer is output to the secondary side of the transformer. The energy of the capacitor C is not output to the secondary side. As a result, a peak current value of the primary winding becomes larger, thereby increasing conduction loss.

SUMMARY OF THE INVENTION

Accordingly, it is an object of the present invention to provide a switching power supply device having high efficiency capable of reducing loss. Furthermore, in this device, stress on the switching elements can also be lowered and the size and weight of the transformer can be reduced.

In order to solve the problems described above, according to an aspect of the present invention, there is provided a switching power supply device including a first switching circuit formed by a parallel connection circuit of a first switching element Q1, a first diode D1, and a first capacitor C1, a second switching circuit formed by a parallel connection circuit of a second switching element Q2, a second diode D2, and a second capacitor C2, the first and second switching circuits forming a series circuit, an input power source connected to the series circuit, a transformer T including a primary winding and a secondary winding, the primary winding, a leakage inductor L, and a capacitor C forming a series circuit, one end of the series circuit being connected to a junction of the first switching circuit and the second switching circuit and the other end thereof being connected to the input power source, a rectifying and smoothing circuit including a rectifying element Ds. the rectifying and smoothing circuit being connected to the secondary winding of the transformer T, energy being accumulated in the primary winding and the capacitor C during an ON-period of the first switching clement Q1 and an output being obtained from the secondary winding during an OFF-period of the first switching element Q1, an ON-time of the first switching element Q1 being controlled so that an output power is controlled, a first driving winding included in the transformer T to generate a voltage substantially proportional to a voltage of the primary winding turning on the first switching element Q1, a second driving winding included in the transformer to generate a voltage substantially proportional to a voltage of the primary winding turning on the second switching element Q2, and switching control circuits alternately turning on and off the first and second switching elements Q1 and Q2 before and after periods during which the switching elements Q1 and Q2 are both turned off, the first switching element Q1 being turned on after the second switching element Q2 and the rectifying element Ds are both turned off, so that a self-excited oscillation is performed.

With the above arrangement, there can be obtained advantages as follows:

(1) Since the voltage applied to each of the first and second switching elements Q1 and Q2 is an input voltage, semiconductor elements having low voltage ratings can be used as the switching elements Q1 and Q2. For example, the on-resistance of a typical MOS-FET increases in proportion to approximately the square of the breakdown withstand voltage. However, when a switching element having a low voltage rating is used, the on-resistance becomes small, whereby conduction loss can be reduced. Additionally, usually, an element having a low voltage rating is less expensive. Thus, by reducing the heat generation of switching elements, the entire switching power supply device can have high efficiency and the device can be produced at low cost, with the weight and size reduced.

(2) The voltage applied to the primary winding of the transformer T is approximately half the voltage in the conventional switching power supply device shown in FIG. 1. As a result, the number of turns of the primary winding can be reduced and the core gap can thereby be made small. Furthermore, a transformer T having the desired voltage breakdown properties can be designed easily, whereby the transformer can be miniaturized.

(3) Since the switching elements Q1 and Q2 of the first and second switching circuits are connected in parallel to the diodes and the capacitors, the switching elements Q1 and Q2 are turned on at zero voltage, and the switching element Q2 is turned off at zero current. As a result, switching loss is greatly reduced and heat generation can be prevented.

(4) The secondary-side rectifying element Ds is turned on at zero current and the current waveform rises relatively steeply at zero level and reaches a peak point where a ratio of current changes is zero. After that, the current waveform falls at zero level again, at which the rectifying element Ds turns off. When compared with a conventional inverted triangular waveform, the waveform is like a rectangular form, whereby a peak current value can be lowered. As a result. an effective current value can be small and conduction loss can thereby be reduced.

(5) There is no need for isolation with the use of a pulse transformer or photo coupler. In this invention, the two switching elements Q1 and Q2 having different ground levels can be driven. Moreover, since the switching elements Q1 and Q2 are adapted to the self-excited oscillation structure. it is unnecessary to use a switching controlling IC with another oscillator. Accordingly, since the switching control circuits do not have complicated structures, the entire device can be made compact at low cost.

In the switching power supply device according to the invention, each of the switching control circuits may include a resistor or a delay circuit formed by a series circuit composed of a resistor and a capacitor, the resistor or the delay circuit being arranged between the first driving winding and a control terminal of the first switching element and between the secondary driving winding and a control terminal of the second switching element, respectively. In this switching power supply device, each of the first and second switching elements is turned on with a delay after the voltage substantially proportional to the voltage of the primary winding turning on each of the first and second switching elements is generated in each of the first and second driving windings.

Therefore, before and after the periods in which the two switching elements Q1 and Q2 are both turned off, the switching elements Q1 and Q2 can be alternately turned on and off easily. With this arrangement, increase in loss and destruction due to the simultaneous turn-on of the two switching elements Q1 and Q2 can be prevented.

Furthermore, in the switching power supply device, one of the switching control circuits may include a switching unit for turning off the first switching element and a time constant circuit controlling in such a manner that the first switching element is turned off by the switching unit after a predetermined period of time has passed from the generation of the voltage substantially proportional to the voltage of the primary winding turning on the first switching element in the first driving winding.

With the switching unit for turning off the first switching element Q1, the speed of switching of the switching element Q1 can be increased, whereby switching loss caused by the switching element Q1 can be reduced. In addition. with the time constant circuit setting the ON-time of the switching element Q1, the ON-time of the switching element Q1 can be arbitrarily set or controlled to stabilize an output voltage.

Furthermore, in the switching power supply device, the remaining switching control circuit may include a switching unit for turning off the second switching element and a time constant circuit controlling in such a manner that the second switching element is turned off by the switching unit after the predetermined period of time has passed from the generation of the voltage substantially proportional to the voltage of the primary winding turning on the second switching element in the second driving winding.

Similar to the previous case, the switching speed of the switching element Q2 can be increased, whereby the switching loss of the switching element Q2 can be reduced. In addition, with the time constant circuit setting the ON-time of the switching element Q2, the ON-time of the switching element Q2 can be arbitrarily set and controlled to stabilize an output voltage.

Furthermore, in the switching power supply device of the invention, the switching unit may be formed by a transistor connected to a control terminal of the first or second switching element, and the control terminal of the transistor may be connected to the time constant circuit composed of a first impedance circuit and a charge/discharge capacitor.

Therefore it is unnecessary to use a MOS-FET or an IC having a high voltage rating in order to drive the high-side switching element Q2. With the simplified structure including the transistor and the time constant circuit, the switching element Q2 can be driven. Thus, the size and weight of the switching power supply device of the invention can be reduced and the device can be produced at low cost. In addition, since it is unnecessary to use an oscillator driving each of the switching elements Q1 and Q2, further reduction in the size, weight, and cost can be achieved.

Furthermore, in the switching power supply device of the invention, the impedance of the first impedance circuit forming the time constant circuit may change according to the output power or in response to an external signal.

According to the output power or in response to signals from the outside, the impedance value of the impedance circuit forming the time constant circuit is changed. With this arrangement, the time for charging and discharging the capacitors included in the time constant circuits is changed. As a result, the ON-time of each of the switching elements Q1 and Q2 can be controlled to allow the switching elements Q and Q2 to perform switching operations in the ON-time most appropriate according to the output voltage.

Furthermore, the switching power supply device may further include a second impedance circuit including a resistor, the second impedance circuit being connected to both ends of the capacitor C or both ends of the series circuit composed of the capacitor C and the primary winding of the transformer T to apply an input voltage to the first switching circuit via the second impedance circuit.

By connecting the impedance circuit including the resistor to both ends of the capacitor C or both ends of the series circuit composed of the capacitor C and the primary winding of the transformer T, via the impedance circuit, a starting-up voltage can be applied to the first switching circuit. Without the impedance circuit, since the input voltage is applied to the capacitor C, even when a voltage is applied to the control terminal of the switching element Q1, an oscillation rarely does not start. The impedance circuit may be connected to both ends of the series circuit composed of the capacitor C and the primary winding of the transformer T. However, it is preferable that the impedance circuit is connected to both ends of the capacitor C, since this arrangement permits the voltage applied to the impedance circuit to become lower, whereby the loss can be more reduced.

Furthermore, the switching power supply device may further include a third impedance circuit including a resistor to divide the input voltage applied to the switching circuit via the second impedance circuit and apply to the control terminal of the first switching element to start a self-excited oscillation.

In this case, the voltage applied to the first switching circuit is divided by the third impedance circuit including the resistor to apply to the control terminal of the switching element Q1 so as to start a self-excited oscillation. In this situation, the voltage-dividing resistors are not connected to the input power source but connected to the first switching circuit. As a result, only when a voltage is applied to the first switching circuit, an oscillation can be started. This leads to the prevention of start-up failure.

In addition, since it is unnecessary to dispose a one-shot pulse generation circuit for starting an oscillation, the switching control circuits can be simplified. Thus, the entire device can be miniaturized and produced at low cost.

Furthermore, the switching power supply device may further include a capacitor Cs connected in parallel to the rectifying element Ds, a capacitive impedance value of the capacitor Cs being set in such a manner that when the second switching element Q2 and the rectifying element Ds arc both turned off, the capacitor Cs resonates with the inductor of the transformer T and a voltage waveform across the capacitor Cs thereby represents a waveform like a part of a sinusoidal waveform, rising at zero voltage or falling at zero voltage.

In the ON-time of the switching element Q1, charge accumulated in the capacitor (or capacitive impedance element) Cs can be output without flowing through the rectifying element Ds when the conduction of the rectifying element Ds starts. Thus, the conduction loss of the rectifying element Ds can be reduced. In addition, when the reverse recovery loss of the rectifying element Ds is reduced and a steep voltage change is controlled, noises can be decreased. Moreover, since the waveform of the current flowing through the rectifying element Ds steeply rises and the current waveform is similar to a rectangular waveform, an effective current can be reduced.

Furthermore, in this invention, the rectifying element Ds may be a switching element performing switching with a control signal.

In this case, for example, the rectifying element Ds is not formed by a typical diode but formed by a switching element such as a MOS-FET having small ON-resistance. When such a switching element performs switching with a control signal, conduction loss in the ON-time of the switching element is reduced, whereby conduction loss caused in the secondary-side rectifying circuit can be reduced.

Furthermore, in the switching power supply device of the invention, the switching element may be a field-effect transistor.

When the first or second switching element is a field-effect transistor such as a MOS-FET, the parasitic diode and the parasitic capacitor can be utilized. Thus, when the parasitic diode is used as the first or second diode D1 or D2 and the parasitic capacitor is used as the first and second capacitor C1 or C2, the diode D1 or and D2 and the capacitor C1 or C2 is not required. Accordingly, the number of components can be reduced.

Furthermore, the switching power supply device may include one of leakage inductor L and an external inductor L or the transformer T connected in series to the primary winding, in which the inductor L resonates with the capacitor C during the OFF-period of the first switching element Q1 to allow the waveform of a current flowing through the primary winding to be a part of a sinusoidal waveform.

The inductor L resonates with the capacitor C in the OFF-period of the first switching element Q1, whereby the waveform of the current flowing through the primary winding becomes a part of the sinusoidal waveform. As a result, a peak current value of the switching element Q2 and a peak value of the current flowing through the rectifying element Ds become smaller, whereby the zero current turn-off operation of the switching element Q2 can be achieved. In addition, when the leakage inductor L of the transformer T is used as the inductor L, the external inductor L is not required. Thus, the number of components can be reduced, and moreover, energy loss due to the leakage inductance of the transformer can be decreased.

Furthermore, in the switching power supply device the switching control circuit may turn on the first or second switching element after voltage across the first or second capacitor drops to zero or near zero.

The zero voltage switching operation is performed by setting a delay time in such a manner that after a voltage across the first or second capacitor drops to zero or near zero, the switching control circuit turns on the switching element Q1 or Q2. With this arrangement, the turn-on loss can be reduced and switching noises can thereby be prevented.

Furthermore, the switching control circuits may turn off the second switching element Q2 when the current flowing through the second switching element Q2 is zero or near to zero.

With this arrangement. the switching element Q2 performs the zero-current turn off operation, whereby the switching loss and switching surge occurring when the switching element is turned off can be reduced.

Furthermore, in this invention, values of the capacitor C and the inductor L may be set in such a manner that after the waveform of a current flowing through the rectifying element Ds rises from zero and reaches a peak point at which a ratio of current change is zero, the waveform again falls to the point of zero current at which the rectifying element Ds is turned off.

Since a peak current value of the current flowing through the rectifying element Ds lowers and the waveform is similar to a rectangular waveform, the effective current decreases and the conduction loss of the rectifying element Ds is thereby reduced. In addition, since the current flowing through the rectifying element Ds does not change sharply, the occurrence of switching noises is suppressed and the rectifying element Ds is turned off at zero current. whereby the reverse recovery loss is reduced.

Furthermore, the switching control circuit may control in such a manner that a ratio of an excitation quantity in a direction of the transformer to an excitation quantity in a forward direction thereof changes according to the magnitude of a load connected to an output terminal of the rectifying and smoothing circuit.

The voltage of the output of the rectifying and smoothing circuit is controlled by changing the ON-time of the switching element Q1 to supply a stabilized output voltage to the load. Additionally, for example, while making the ON-time of the switching element Q2 substantially fixed, according to the magnitude of the load connected to the output of the rectifying and smoothing circuit, the ratio of the excitation quantity in the reverse direction and the excitation quantity in the forward direction is changed. With this arrangement, changes in the switching frequency can be suppressed, whereby interference with an electronic apparatus can be prevented and loss in the control circuit can be reduced.

Furthermore, the switching control circuit may control in such a manner that the excitation quantity in the reverse direction of the transformer is zero or substantially a predetermined fixed value regardless of the magnitude of the load connected to the output terminal of the rectifying and smoothing circuit.

In this switching power supply device, by changing the ON-time of the switching element Q1 to control the output voltage of the rectifying and smoothing circuit, a stabilized output voltage can be supplied to the load. In addition, the ON-time of the switching element Q2 is controlled such that the excitation quantity in the reverse direction of the transformer is zero or is substantially a predetermined fixed value regardless of the magnitude of the load connected to the output terminal of the rectifying and smoothing circuit. With this arrangement. conduction loss in the transformer and the switching circuit due to the regeneration of a current can be reduced.

Furthermore, one of the switching control circuits may set the ON-time of the switching element to be at a minimum value or greater to perform switching even in a state in which the load connected to the output terminal of the rectifying and smoothing circuit is short-circuited.

In this case, by setting the ON-time of the switching element to be a minimum value or greater to perform switching even in the state in which the load is short-circuited, the switching operation can be continued even in the short-circuited state. Therefore, when the short-circuited state is cleared, the output is applied to the load again automatically. Thus, an overcurrent protective circuit of a self-recovery type capable of restoring output can be formed. When an ON-time equivalent to a value equal to or less than the minimum value is set, under a short-circuited load, an input voltage is applied to the capacitor C and the oscillation thereby stops, whereby a latch-type overcurrent protective circuit is formed.

BRIEF DESCRIPTION OF THE DRAWING(S)

FIG. 1 schematically illustrates the structure of a conventional switching power supply device;

DETAILED DESCRIPTION OF EMBODIMENTS OF THE INVENTION

Figure 2:
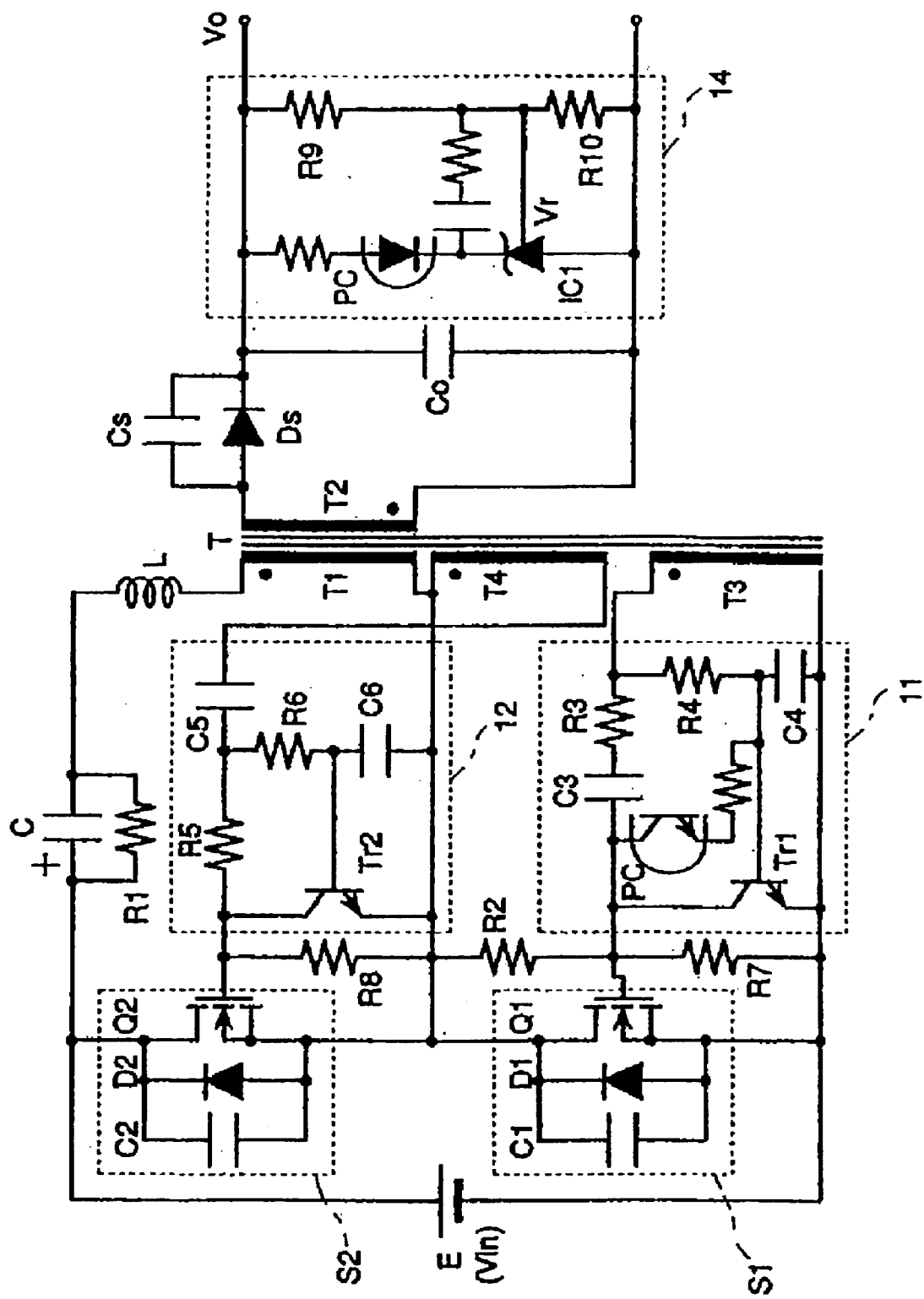
FIG. 2 is a circuit diagram of a switching power supply device according to an embodiment of the present invention.

FIG. 2 is a circuit diagram of a switching power supply device according to an embodiment of the present invention.

Figure 1:
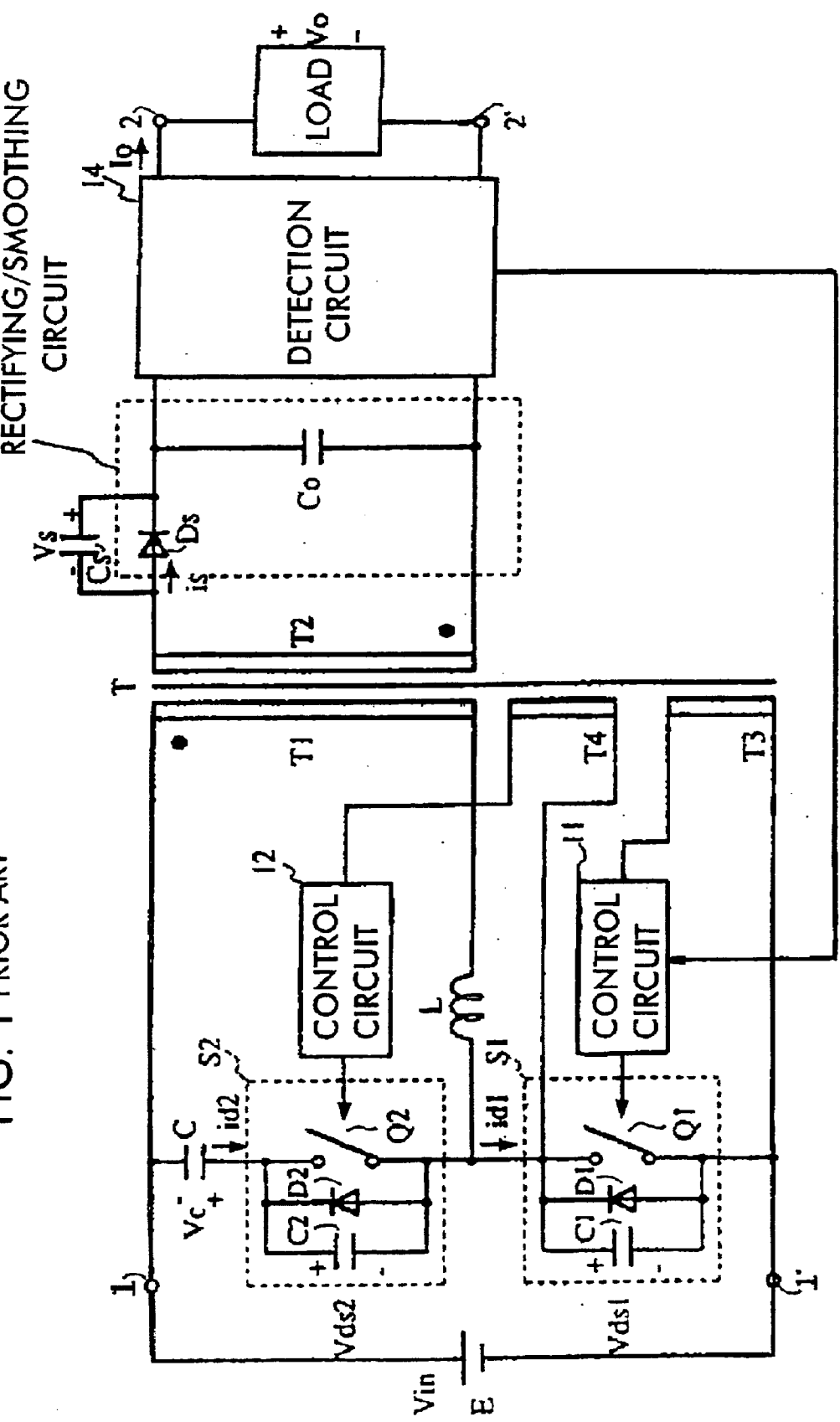

Basically, the switching power supply device of the embodiment differs from the conventional switching power supply device shown in FIG. 1 by including a series circuit formed by connecting a primary winding T1 of a transformer T, an inductor L, and a capacitor C, one end of the series circuit being connected to a junction of a first switching circuit and a second switching circuit and the other end thereof being connected to an input power source. Next, the circuit structure of the switching power supply device will be explained in detail.

The first switching circuit S1 is formed by a parallel connection circuit of a first switching element Q1, a first diode D1, and a first capacitor C1. The second switching circuit S2 is formed by a parallel connection circuit of a second switching element Q2, a second diode D2, and a second capacitor C2. The first and second switching circuits S1 and S2 are connected in series to each other, and the series circuit is connected in parallel to an input power source E. The first and second switching elements Q1 and Q2 used in this embodiment are field-effect transistors (hereinafter referred to as FETs).

The primary winding T1 of the transformer T is connected in series to the inductor L and the capacitor C. One end of this series circuit is connected to the junction of the first switching circuit S1 and the second switching circuit S2 and the other end thereof is connected to the input power source E.

A driving winding T3 of the transformer T generates a voltage substantially proportional to a voltage of the primary winding T1. The voltage generated in the driving winding T3 is input to a first control circuit 11. The first control circuit 11 includes a delay circuit formed by connecting in series a resistor R3 and a capacitor C3 arranged between the first driving winding T3 and a control terminal (gate) of the first switching element Q1, a transistor Tr1 as a switching unit for turning off the first switching element Q1, and a time constant circuit composed of a capacitor C4 and a photocoupler PC as a first impedance circuit receiving a feedback signal from a detection circuit 14. The time constant circuit is connected to a control terminal (base) of the transistor Tr1. The control circuit 11 allows the first switching element Q1 to turn on with a delay after the voltage is generated in the first driving winding 13. Then, the control circuit 11 also allows the first switching element Q1 to turn off quickly by turning on the transistor Tr1 when a time set by the time constant circuit composed of the impedance of the photocoupler PC and the capacitor C4 elapses after the generation of the voltage in the first driving winding T3. In this manner, the control circuit 11 can change the ON-time of the first switching element Q1 arbitrarily.

The transformer T includes a second driving winding T4. A voltage generated in the second driving winding T4 is applied to a second control circuit 12. The second control circuit 12 includes a delay circuit formed by connecting in series a resistor R5 and a capacitor C5, which is connected in series to the second driving winding T4, a transistor Tr2 as a switching unit for turning off the second switching element Q2, and a time constant circuit composed of a charge/discharge capacitor C6 and a resistor R6 as a first impedance circuit. The time constant circuit is connected to a control terminal (base) of the transistor Tr2. The delay circuit, the first impedance circuit, and the transistor Tr2 included in the second control circuit have similar structures as those of the first control circuit described above.

In each of the control circuits 11 and 12, a delay time is set in such a manner that each of the switching elements Q1 and Q2 is turned on after a voltage across each of the capacitors C1 and C2 drops to zero or near zero. With this arrangement, a zero-voltage switching operation is performed. As a result, turn-on loss can be reduced and the occurrence of switching noises can be prevented. Furthermore, the control circuit 12 controls the second switching element Q2 such that it turns off when a current flowing through the second switching element Q2 is zero or near to zero. With this control, the switching element Q2 performs zero-current turn-off operation, thereby reducing switching loss and switching surge occurring when the element Q2 is turned off. Furthermore, as the waveform of a current flowing through the rectifying element Ds becomes closer to a rectangular form, loss in the rectifying element Ds becomes smaller. Thus, in order to obtain such a waveform, values of the capacitor C and the inductor L, with the ON-period of the second switching element Q2 set by the switching control circuit, are determined.

The detection circuit 14 includes voltage dividing resistors R9 and R10, a shunt regulator IC1 in which a junction of the resistors R9 and R10 is connected to a reference voltage input terminal Vr, and a photodiode IC connected in series to the shunt regulator IC1. The shunt regulator IC1 controls a current flowing between the cathode and the anode to maintain the voltage of the reference voltage input terminal Vr constant. Changes in the current are converted into the intensity of light of the photodiode PC and input to a phototransistor PC connected to the first driving winding T3 of the transformer T. In this circuit, according to changes in a current flowing through the photodiode PC, the turn-ON-time of the transistor Tr1 is controlled via the phototransistor PC. which eventually leads to control of the ON-time of the first switching element Q1. Specifically, when the output voltage becomes high and the current of the photodiode PC begins to increase, the ON-time of the first switching element Q1 becomes shorter to drop the output voltage. In contrast, when the output voltage becomes low and the current of the photodiode PC begins to decrease, the ON-time of the first switching element Q1 becomes longer to raise the output voltage. With the operation, the output voltage can be stabilized.

A resistor R1 as a second impedance circuit is connected in parallel to the capacitor C connected in series to the primary winding T1 of the transformer T. By connecting the resistor R1 in parallel to the capacitor C, when power is turned on, a starting-up voltage can be applied to the first switching circuit S1 via the resistor R1. When the resistor R1 is not provided, an input voltage Vin is applied to the capacitor C. In this case, even if a voltage is applied to the control terminal (gate) of the first switching element Q1, a current cannot flow through the transformer. Thus. oscillation cannot be started. The resistor R1 may be connected to both ends of the series circuit composed of the capacitor C, the primary winding T1 of the transformer T, and the inductor L. However, as shown in the embodiment, with the resistor R1 connected in parallel to the capacitor C, the voltage applied to the resistor R1 becomes lower, thereby reducing loss.

The voltage applied to the first switching circuit S1 via the resistor R1 is divided by a series circuit composed of resistors R2 and R7 as a third impedance circuit connected to both ends of the first switching element Q1, and is applied to the control terminal (gate) of the first switching element Q1. With this arrangement, when the input voltage Vin is applied, a self-excited oscillation can be started. In this embodiment, the resistor R2 is not connected to the input power source but connected to the first switching circuit S1. With this connection, only when a voltage is applied to the first switching circuit S1, the voltage can be input to the control terminal of the switching element Q1 to start oscillation. As a result, starting-up failure can be prevented.

Next, a description will be given of the operation of the above switching power supply device.

Figure 3:
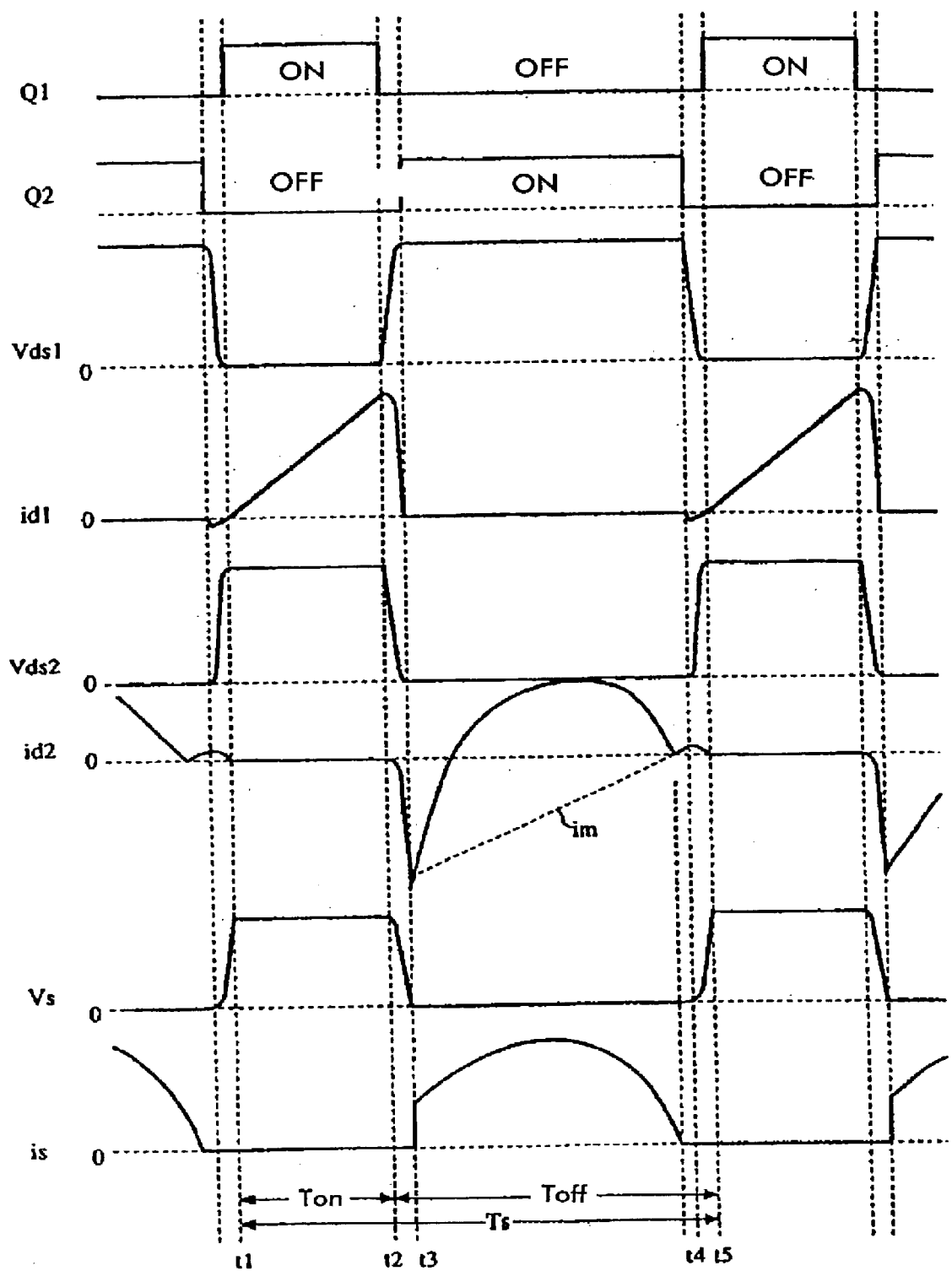
FIG. 3 illustrates waveforms of the switching power supply device.

FIG. 3 illustrates waveforms of the circuit shown in FIG. 2. The circuit operation will be explained below with reference to FIGS. 2 and 3.

In FIG. 3, Q1 and Q2 denote signals showing the ON and OFF times of the switching elements Q1 and Q2, Vds1, Vds2, and Vds denote the waveform signals of voltages across the capacitors C1, C2, and Cs, and id1, id2, and is denote current-waveform signals of the switching circuit S1, S2. and the rectifying element Ds.

Switching performed after the circuit starts up can mainly be divided into four operation states from times t1 to t5 in one switching period Ts. First, a state at a starting-up time (when oscillation starts) will be explained, and then, explanations about the remaining states will follow.

STARTING-UP

When the input voltage Vin is applied, the voltage is applied to the drain of the first switching element (FET) Q1 through the circuit comprising resistor R1, the inductor L, and the primary winding T1. The input voltage is divided by the resistors R2 and R7 to apply to the gate of the FET Q1. When the voltage becomes higher than the threshold voltage of the FET Q1, the FET Q1 turns on and the input voltage is applied to the capacitor C and the transformer T1. Then, a voltage is generated in the first driving winding T3 and the generated voltage is applied to the gate of the FET Q1 via the resistor R3 and the capacitor C3. As a result, the FET Q1 is on.

Next, a description will be given of the four operation states from the time t1 to t5 in one switching period Ts under optimum rating conditions from the ON-state of the FET Q1.

STATE 1—t1 to t2

The FET Q1 is in an ON-state. A voltage obtained by subtracting the capacitor Cvoltage from the input voltage Vin is applied to the primary winding T1 of the transformer T. Then, a current flowing through the primary winding T increases linearly and excitation energy is thereby stored in the transformer T. In addition. with the current, since the capacitor C is charged. electrostatic energy is stored in the capacitor C.

In this situation, the capacitor C4 is charged via the phototransistor PC. When the voltage of the capacitor C4 reaches a threshold voltage (approximately 0.6 V) of the transistor Tr1, the transistor Tr1 turns on and the FET Q1 turns off at the time t2. Then, the state 2 follows.

STATE 2—t2 to t3

When the FET Q1 turns off, the primary winding T1 and the inductor L resonate with the capacitors C1 and C2, whereby the capacitor C1 is charged and the capacitor C2 is discharged. On the secondary primary side, the secondary winding T2 resonates with the capacitor Cs, whereby the capacitor Cs is discharged. Curves at the rising of the Vds1 and at the falling of Vds2 are parts of a sinusoidal wave produced by the resonance due to the inductor L, the primary winding T1 and the capacitors C1 and C2.

When a voltage Vds2 across the capacitor C2 drops to zero, the diode D2 conducts. A voltage generated in the driving winding T4 is applied to the gate terminal of the switching element Q2 via a capacitor C5 and a resistor R5 with a little delay after the turn-off of the FET Q1, and the switching element Q2 is turned on. As a result, zero-voltage switching is performed and followed by the state 3.

In this case, on the secondary side, a voltage Vs across the capacitor Cs drops to zero and the rectifying element Ds conducts, whereby zero-voltage turn-on operation is performed. A curve at the rising of Vs is a part of a sinusoidal wave produced by the resonance between the capacitor Cs and the secondary winding T2.

STATE 3—t3 to t4

In state 3, on the primary side, the diode D2 or the switching element Q2 conduct, and the inductor L and the capacitor C then begin to resonate with each other. In this period, the capacitor C is discharged. In this situation, on the secondary side, the rectifying element Ds conducts to discharge the excitation energy stored in the transformer T and the electrostatic energy stored in the capacitor C from the secondary winding T2 and output via the rectifying/smoothing circuit. In this situation, the waveform of a current "is" flowing through the rectifying element Ds is similar to a waveform representing a value obtained by subtracting the value of a linearly decreasing excitation current "im" from the value of a resonant current id2 produced by the inductor L and the capacitor C on the primary side. Thus, the waveform rises relatively steeply at zero current to become a waveform having a sinusoidal curve. Then, after reaching a peak point at which a current change ratio is zero. the waveform falls to zero current. When the excitation current im of the transformer T becomes zero, the rectifying element Ds performs zero-current turn-off operation, whereby the secondary-side current is becomes zero.

On the primary side, by discharging the capacitor C, the direction of the excitation current "im" is reversed, and the transformer T is thereby excited in a direction opposed to the direction in the state 1. The capacitor C6 is charged with a voltage generated in the second driving winding T4 via the resistor R6. When the voltage reaches the threshold voltage (approximately 0.6 V), the transistor Tr2 turns on and the FET Q2 turns off near zero current at the time t4, so that zero-current turning-off operation is performed. When the FET Q2 turns off, an inverted voltage is applied to the secondary-side rectifying diode and thereby the capacitor Cs begins to resonate. As a result, the winding voltage of the transformer begins to invert.

In this situation, according to the magnitude of a load connected to an output terminal, there is a change in the sequence of the time in which the excitation current "im"

becomes zero and the time in which the FET Q2 turns off. In other words, when the load is light, after the excitation current "im" becomes zero, the FET Q2 turns off and then an inverted voltage is applied to the rectifying clement Ds. In contrast, under heavy load, after the FET Q2 turns off, the excitation current "im" becomes zero and an inverted voltage is applied to the rectifying element Ds. In either loading condition, at the time t4 in which both the FET Q2 and the rectifying element Ds are turned off. an inverted voltage is applied to the rectifying element Ds. which will be followed by the state 4.

STATE 4—t4 to t5

In state 4, the secondary winding T2 of the transformer T resonates with the capacitor Cs, whereby the capacitor Cs is charged. On the primary side, the primary winding T1 and the inductor L resonate with the capacitors C1 and C2, whereby the capacitor C1 is discharged and the capacitor C2 is charged.

When a voltage Vds1 across the capacitor C1 drops to zero, the diode D1 conducts. In this situation. a voltage generated in the primary driving winding T3 is applied to the gate of the switching element Q1 with a little delay via the resistor R3 and the capacitor C3. Then, the FET Q1 is turned on at the time t5 and the zero-voltage switching operation is performed to end the state 5. On the secondary side, a voltage Vs across the capacitor Cs rises from zero and is clamped at a voltage equal to the sum of-the secondary-winding voltage and the output voltage.

The above operation will be performed during every switching period to repeat in a series of switching periods.

With the above operation, in the period of time during which the first switching element Q1 is in the ON-state, excitation energy is stored in the primary winding T1 of the transformer T and electrostatic energy is stored in the capacitor C. When the switching element Q1 turns off, the excitation energy and the electrostatic energy are discharged. As a result, when compared with the conventional switching power supply device as shown in FIG. 1, that is, a device storing only excitation energy during the ON-period of the switching element Q1 and discharging the excitation energy during the OFF-period thereof, the current peak value can be smaller, thereby enabling reduction in conduction loss.

In the switching power supply device shown in FIG. 2, as in the case of the conventional switching power supply device, the switching elements Q1 and Q2 are turned on at the zero voltage and the switching element Q2 is turned off near the zero current. Consequently, switching loss and switching surge can be significantly reduced. In addition, the secondary-side rectifying element Ds turns on at the zero current, and the current waveform rises relatively steeply from the zero current. After the waveform reaches the peak point at which the current change ratio is zero, the waveform falls to the zero current again so that the rectifying element Ds is turned off. Therefore, the waveform of the current flowing through the rectifying element becomes rectangular, thereby making the peak current value small. As a result, the effective current value is lowered, whereby conduction loss can be reduced.

Furthermore, since the leakage inductor 1 of the transformer is arranged not to occur, a switching surge is clamped. Thus, a semiconductor element having a low voltage rating can be used. Moreover, since steep changes in the current flowing through the switching element and the voltage are reduced, switching noises can also be reduced.

Now, regarding the control of the ON/OFF-time of the switching elements Q1 and Q2 performed by the control circuits, the following three methods can be adopted.

Figure 4A:
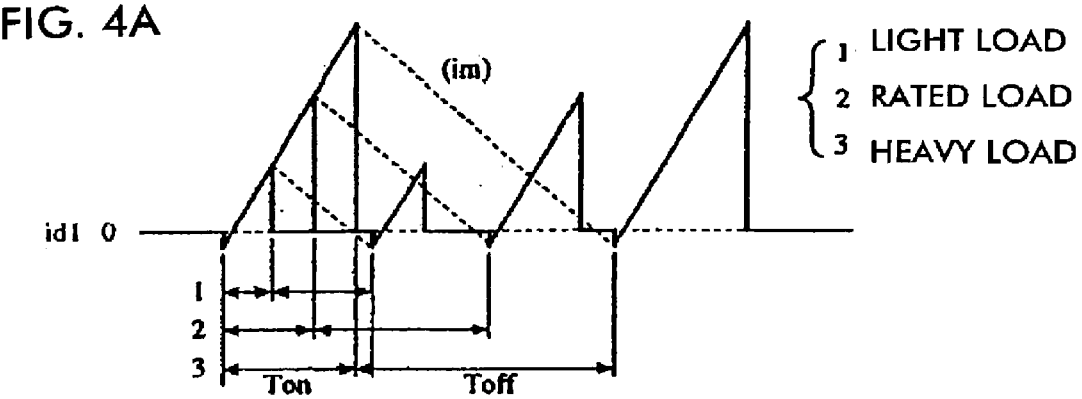
FIGS. 4A to 4C illustrate primary-side current waveforms obtained by different controlling methods.
Figure 4B:
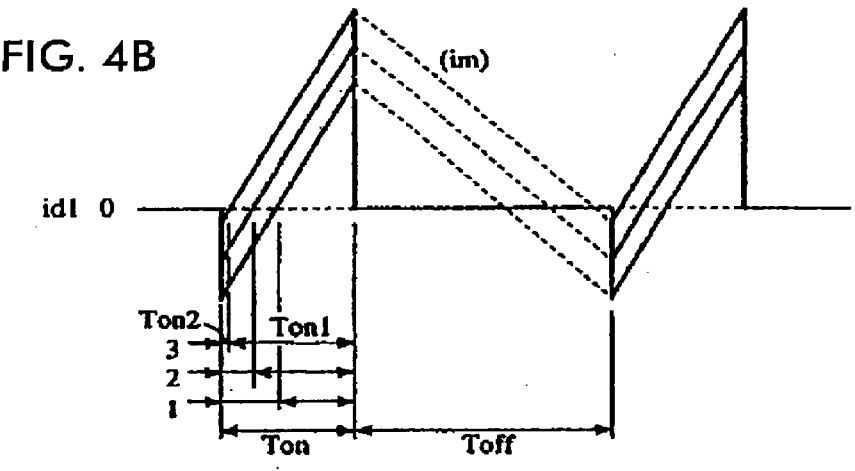
Figure 4C:
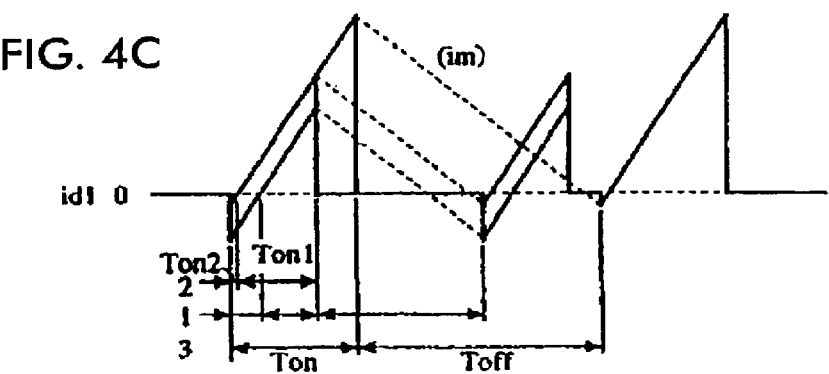

FIGS. 4A to 4C show the waveforms of "id1" obtained by the three controlling methods.

In a method shown by FIG. 4A, the switching control circuits control the ON-time of the switching elements Q1 and Q2 and stabilize an output voltage by setting an excitation quantity in a reverse direction of the transformer T to be zero or a minimum value necessary to realize the zero-voltage switching operation. In this method, according to the amount of the load, the ratio between the ON-time (Ton) and OFF-time (Toff) of the switching element Q1 is fixed, thereby changing the switching frequency. Thus, since the amount of the load is substantially inversely proportional to the switching frequency, the lighter the load, the higher the switching frequency. For example, the control of an output voltage Vo may be performed in the ON-time of the switching element Q1. Besides the output voltage Vo, an output current Io may also be detected to set the conduction time of the switching circuit S2 to be equal to the sum of a time for resetting the transformer T and a predetermined reverse excitation time.

In a method shown by FIG. 4B, under light load, a regenerative current is generated in the primary winding of the transformer T. The symbol Ton2 indicates a period of time in which the regenerative current is generated. In this method, the switching control circuits control such that the ON-time of the switching element Q2 is maintained constant and the ON-time of the switching element Q1 is adjusted to change the ratio between the excitation quantity in the forward direction of the transformer T and the excitation quantity in the reverse direction thereof so that an output voltage is stabilized. In this method, regardless of the amount of the load, the switching frequency is substantially fixed. For example, in this type of control, the conduction time of the switching circuit S2 may be set to be equal to the sum of a maximum transformer-reset time and a predetermined reverse excitation time.

On the other hand, although this method can provide the advantage that the switching frequency is substantially fixed, even under light load a peak value of the current flowing through the switching elements and the transformer is large, whereby switching loss and conduction loss increase and there is the largest change in a magnetic flux of the transformer T. As a result, there exists a significant transformer loss.

A method shown by FIG. 4C is equivalent to a combination of the methods of FIGS. 4A and 4B. Under light load, an output voltage is stabilized by changing the ratio between excitation quantity in the forward direction of the transformer T and excitation quantity in the reverse direction thereof whereby the switching frequency can be lowered. Under heavy load, as the load becomes heavier, the ON-time of the switching element Q1 is set to be longer to stabilize an output voltage. For example, the conduction time of the switching circuit S2 may be set to be equal to the sum of a transformer reset time under rated load and a predetermined reverse excitation time.

In this method, while controlling changes in the switching frequency, highly efficient control can be performed between light load and heavy load.

In the above embodiment, the first and second switching elements Q1 and Q2 comprise by field-effect transistors (FET). Alternatively, other kinds of semiconductor elements such as transistors may be used as the first and second switching elements.

Figure 5:
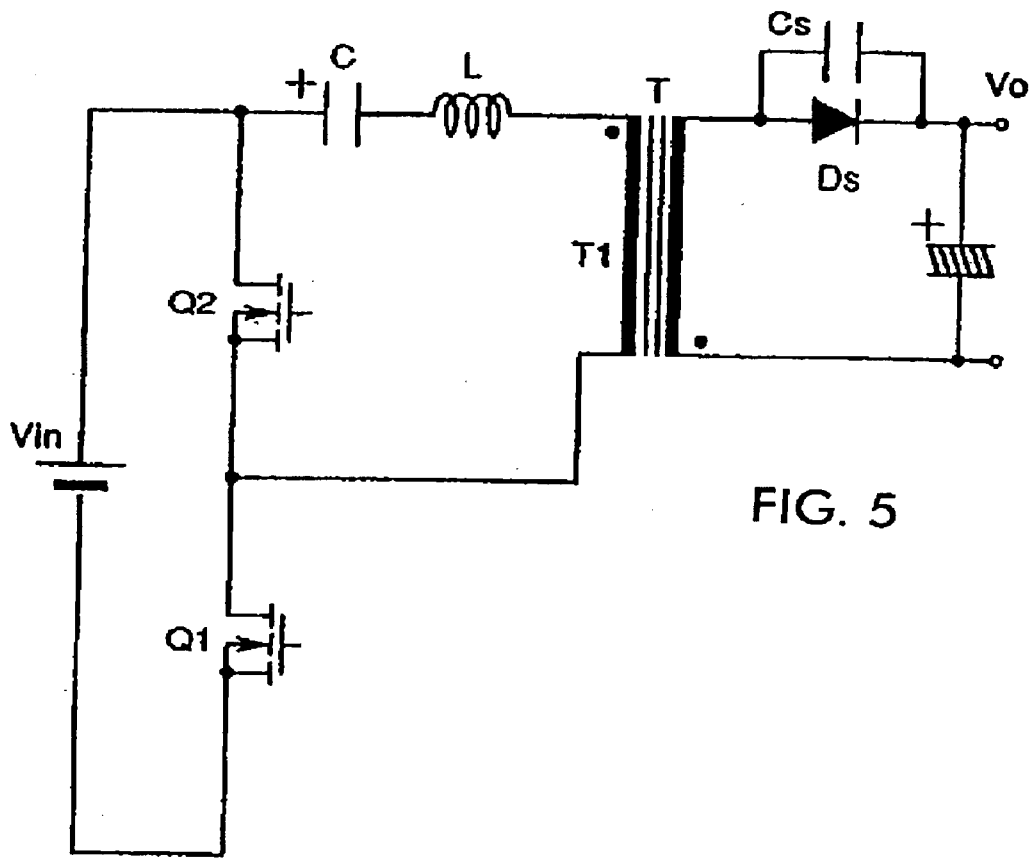
FIG. 5 illustrates a circuit structure of a main part of the above switching power supply device.

FIG. 5 illustrates the main part of the switching power supply device shown in FIG. 2. In this figure, one end of a series circuit composed of the capacitor C, the inductor L, and the primary winding T1 of the transformer T is connected to the junction of the switching elements Q1 and Q2 and the other end of the series circuit is connected to the positive terminal of an input power source.

Figure 6:
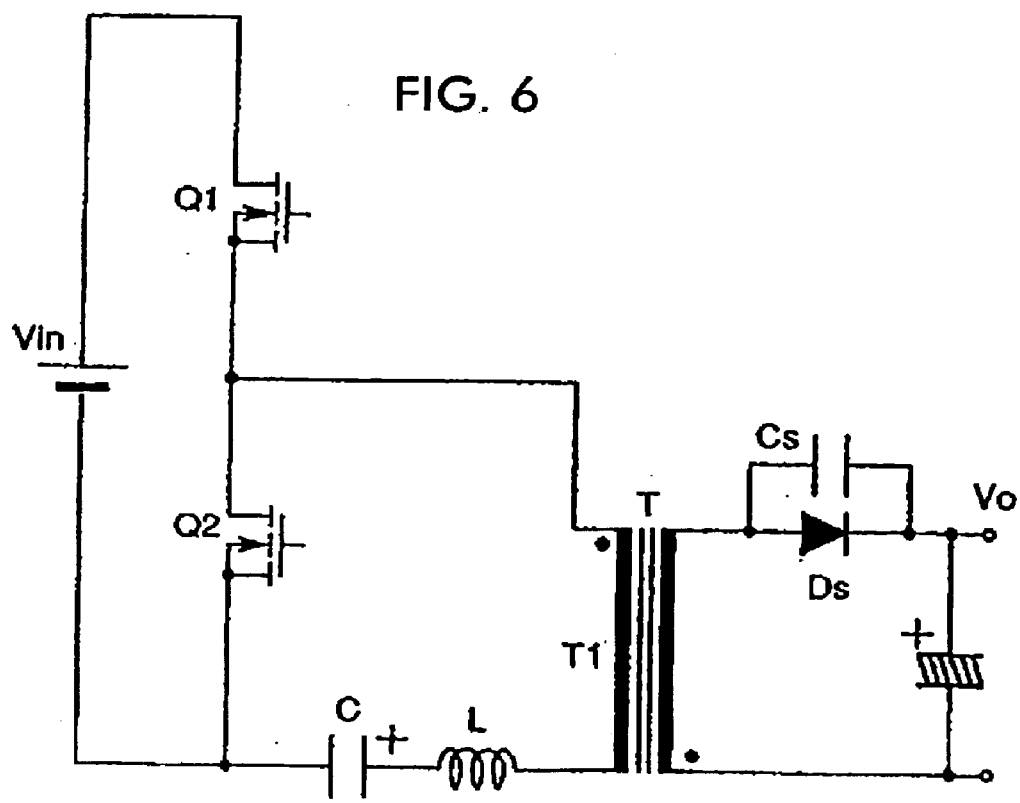
FIG. 6 illustrates a circuit structure of a main part of a switching power supply device according to another embodiment.

FIG. 6 illustrates the main part of a switching power supply device according to another embodiment. In this embodiment, the capacitor connecting position and the polarity of the input voltage Vin are changed, although no change is made in the series circuit composed of the capacitor C1, the inductor L, and the primary winding T1. In addition, similarly one end of the series circuit is connected to the junction of the switching elements Q1 and Q2 and the other end thereof is connected to the input power source. The circuit operation of the main part is also similar to the operation of the circuit shown in FIG. 5.

Figure 7:
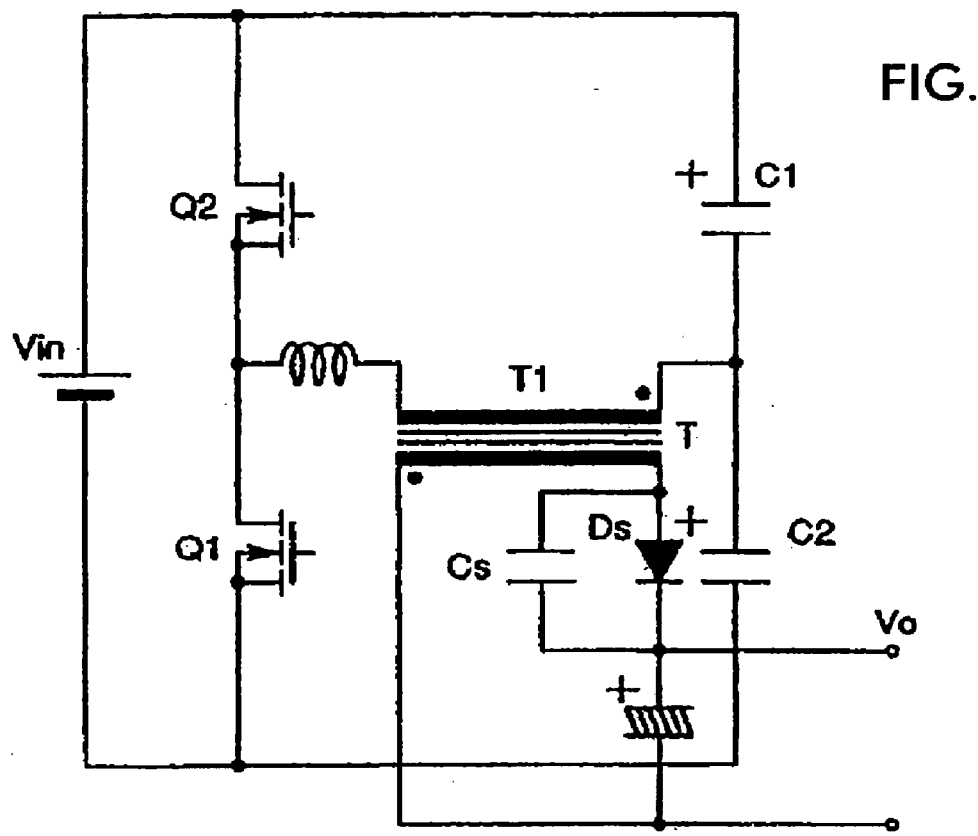
FIG. 7 illustrates a circuit structure of a main part of a switching power supply device according to another embodiment.

FIG. 7 illustrates the main part of a switching power supply device according to another embodiment. In this structure, the capacitor C includes capacitors C1 and C2. Thus, the circuit shown in FIG. 7 is an example in which the capacitor C is divided into the capacitors C1 and C2. Since the synthesized capacitance of the capacitors C1 and C2 is equal to the capacitor C, the circuit operation is similar to that shown in each of FIGS. 2 and 3.

In the embodiments described above, the input power source is a DC power source. However, the input power source of the invention may be a power source in which a commercial AC power is rectified and smoothed. In addition, a capacitor or another component may be connected between the primary winding and the secondary winding of the transformer T. Instead of a transformer, an inductance element may be used in the circuit. Even in this case, the basic operation of the circuit is similar to the circuit operation described above.

Figure 8:
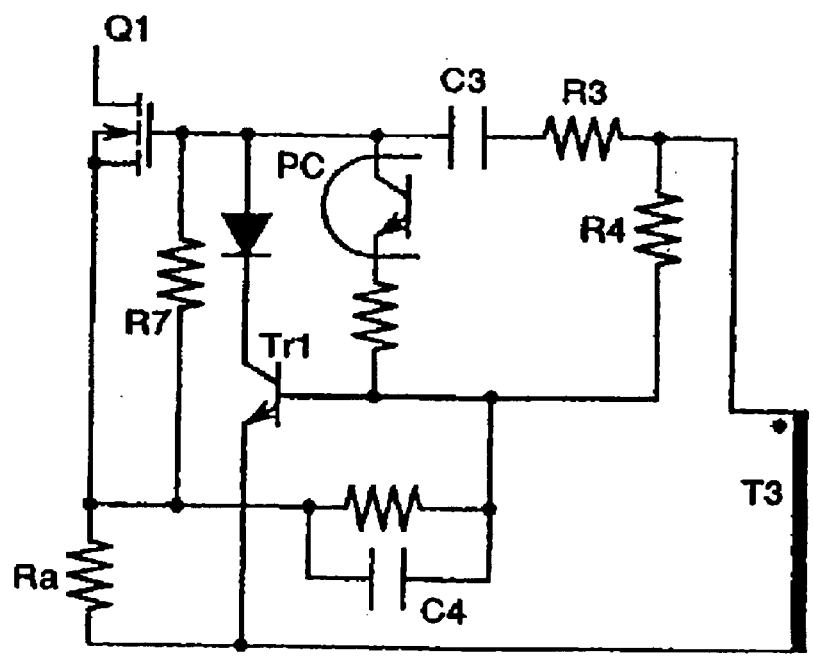
FIG. 8 is a circuit diagram illustrating a first control circuit of a switching power supply device according to another embodiment.

FIG. 8 is a circuit diagram of a first control circuit 11 included in a switching power supply device according to another embodiment.

In this embodiment, a resistor Ra is connected in series to the source of the first switching element Q1 and a capacitor C4 is connected to a junction of the source and the resistor Ra. One end of a time constant circuit composed of a resistor R4, the impedance of a phototransistor PC, and the capacitor C4 is connected to the base of a transistor Tr1. In the time constant circuit, a resistor is connected in parallel to the capacitor C4. In this control circuit, after the switching element Q1 is turned on, a current "id1" increases. With the increase in the current "id1", a voltage across the resistor Ra also increases. In this situation, charging of the capacitor C4 of the time constant circuit continues. When a voltage equal to the sum of a charging voltage of the capacitor C4 and the voltage across the resistor Ra reaches a threshold voltage (approximately 0.6 V) of the transistor Tr1, the switching element Q1 turns off. Therefore, in the circuit of the embodiment, a current flowing through the switching element Q1 is detected by the resistor Ra to control the ON-time of the switching element Q1.

Figure 9:
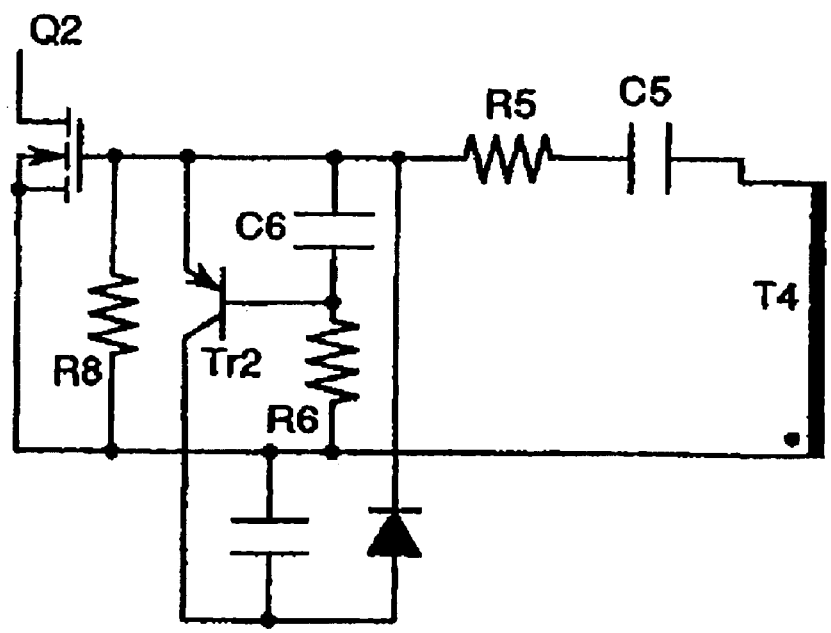
FIG. 9 is a circuit diagram illustrating a second control circuit of a switching power supply device according to another embodiment.

FIG. 9 illustrates the circuit diagram of a second control circuit controlling a switching element Q2 included in a switching power supply device according to another embodiment.

In this embodiment, a transistor Tr2 as a switching unit is a pnp-type transistor.

Figure 10:
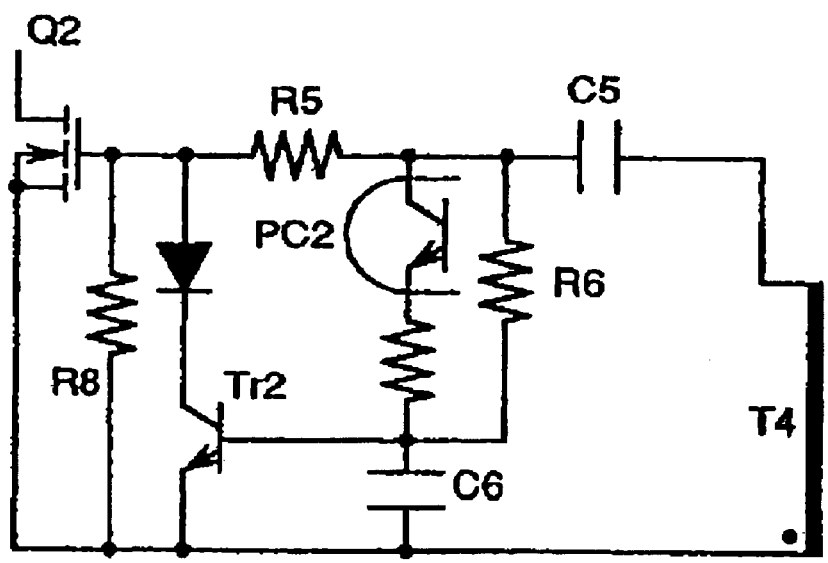
FIG. 10 is a circuit diagram illustrating a second control circuit of a switching power supply device according to another embodiment.

Furthermore, FIG. 10 illustrates the circuit diagram of a second control circuit included in a switching power supply device according to another embodiment.

In this embodiment, a phototransistor PC2 is connected to the base of a transistor Tr2. The impedance of the phototransistor PC2 is changed by output signals or signals input from the outside, whereby the ON-time of the switching element Q2 is changed. With this arrangement, by controlling the ON-time of the switching element Q2, switching of the switching element Q2 can be performed in the most appropriate ON-time according to an output power.

Figure 11:
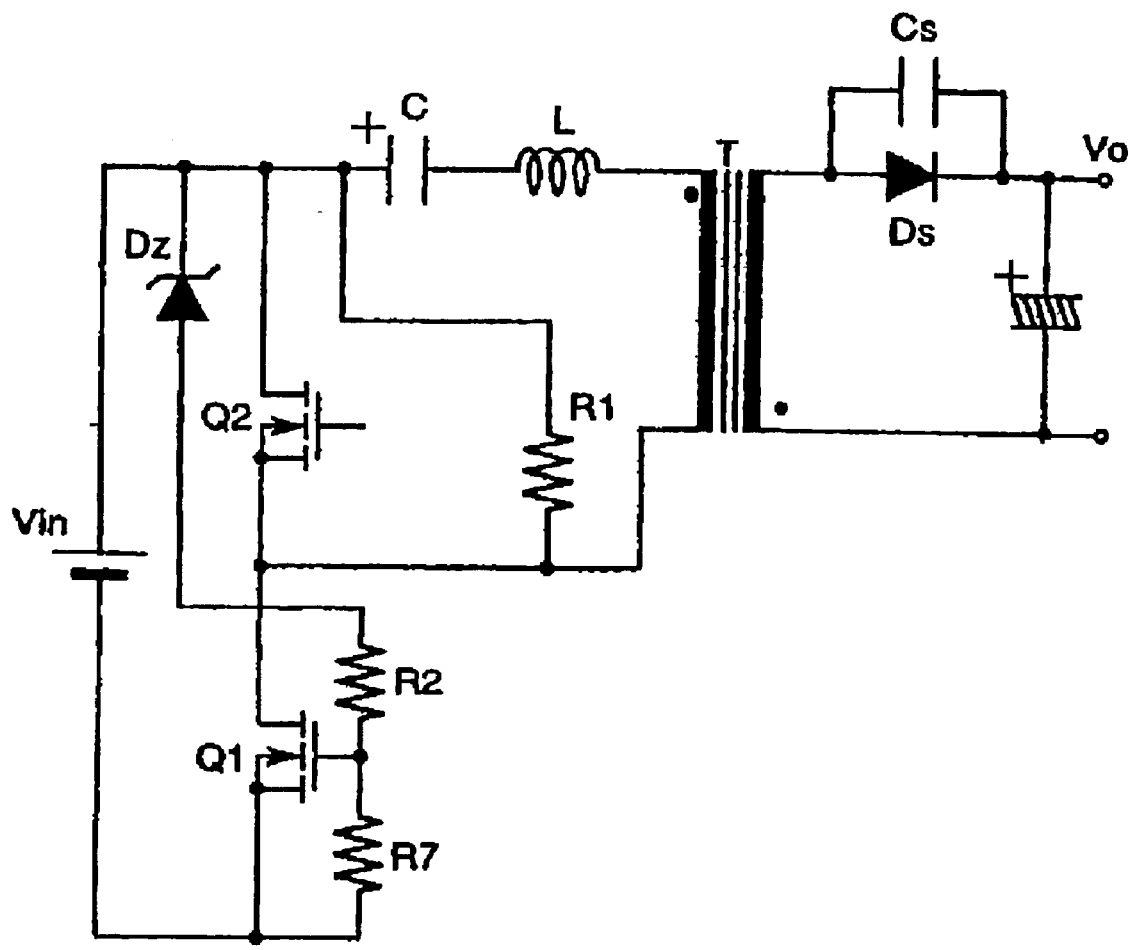
FIG. 11 is a circuit diagram illustrating a starting-up circuit of a switching power supply device according to another embodiment.

FIG. 11 illustrates the circuit diagram of a starting-up circuit included in a switching power supply device according to another embodiment.

In this case, a resistor R1 is connected in parallel to a series circuit composed of the capacitor C, the inductor L, and the primary winding T1 of the transformer T. One end of a starting-up resistor R2 starting a switching element Q1 is connected to an input power source via a Zener diode DZ.

In the embodiments described above, as a rectifying element Ds, a diode is used in the rectifying/smoothing circuit. However, for example, instead of using a diode as the rectifying element Ds, a switching element such as a MOS-FET having a small ON-resistance may be used as the element Ds. When such a switching element performs switching by a control signal produced when a voltage of the secondary winding rises, conduction loss in the ON-time is reduced. As a result, conduction loss in the secondary-side rectifying circuit can be reduced.

When the first and second switching elements Q1 and Q2 are formed by FETs, the parasitic diodes of FETs may be used in place of the first and second diodes D1 and D2 and the parasitic capacitors of FETs may be used in place of the first and second capacitors C1 and C2. In this arrangement, since the first and second diodes and capacitors shown in FIG. 2 are not required, the number of components can be reduced.

Similarly, the inductor L may be formed by only the leakage inductance of the transformer T. In this case, no external inductor L will be required. Consequently, the number of components can be reduced.

Therefore, the advantages of the present invention can be summarized as follows.

The switching power supply device of the invention includes the driving windings driving the first and second switching elements in the transformer, the switching control circuits alternately turning on and off the switching elements before and after the periods in which both switching elements are turned off, so that a self-excited oscillation is performed. With this structure, the number of components and the size and weight of the device can be reduced. In addition, by allowing the switching elements to perform zero-voltage switching operations, switching loss can be significantly reduced. Moreover, since voltages applied to the switching elements Q1 and Q2 are input voltages Vin, the switching elements Q1 and Q2 can be formed by semiconductor elements having low voltage ratings. Thus, the switching power supply device of the invention can have high efficiency and can be produced as a compact and lightweight device.

Furthermore, since the capacitor C is connected in series to the primary winding of the transformer, energy can be stored both in the primary winding and the capacitor C. As a result, by reducing the peak current, conduction loss can also be reduced. Moreover, the voltage applied to the primary winding is approximately half the voltage of a ringing choke converter (RCC) as shown in FIG. 1. Thus, the number of turns of the primary winding can be reduced and a low breakdown voltage transformer having a lower voltage rating can be thereby enabling miniaturization of the transformer.

While the preferred embodiments of the invention have been described above, it is to be understood by those skilled in the art that various modifications and changes may be made without departing from the scope and spirit of the invention.

What is claimed is:

1. A switching power supply device comprising:
a first switching circuit comprising a parallel connection circuit having a first switching element, a first diode, and a first capacitor;
a second switching circuit comprising a parallel connection circuit having a second switching element, a second diode, and a second capacitor, the first and second switching circuits forming a series circuit;
the series circuit being connectable to an input power source;
a transformer including a primary winding and a secondary winding;
the primary winding, an inductance, and a series capacitor forming a series circuit, one end of the series circuit being connected to a junction of the first switching circuit and the second switching circuit and the other end thereof being connectable to the input power source;
a rectifying and smoothing circuit including a rectifying element, the rectifying and smoothing circuit being connected to the secondary winding of the transformer;
energy being accumulated in the primary winding and the series capacitor during an ON-period of the first switching element and an output being obtained from the secondary winding during an OFF-period of the first switching element, an ON-time of the first switching element being controlled so that an output power is controlled;
a first driving winding included in the transformer to generate a voltage substantially proportional to a voltage of the primary winding and for turning on the first switching element;
a second driving winding included in the transformer to generate a voltage substantially proportional to a voltage of the primary winding and for turning on the second switching element; and
switching control circuits alternately turning on and off the first and second switching elements. the switching control circuits alternately turning on the first and second switching elements after periods during which the switching elements are both turned off, the switching control circuits alternately turning off the first and second elements before periods during which the switching elements are both turned off, the first switching element being turned on after the second switching element and the rectifying element are both turned off, so that a self-excited oscillation is performed.

2. The switching power supply device of claim 1, wherein each of the switching control circuits comprises one of a resistor and a delay circuit comprising a series circuit comprising a resistor and a capacitor being arranged between the first driving winding and a control terminal of the first switching element and between the second driving winding and a control terminal of the second switching element, respectively;
wherein each of the first and second switching elements is turned on with a delay after the voltage substantially proportional to the voltage of the primary winding turning on each of the first and second switching elements is generated in each of the first and second driving windings.

3. The switching power supply device of claim 1 wherein a first of the switching control circuits comprises a first switch turning off the first switching element and a first time constant circuit controlling the first switching element so that the first switching element is turned off by the first switch after a predetermined period of time has passed from the generation of the voltage substantially proportional to the voltage of the primary winding turning on the first switching element in the first driving winding.

4. The switching power supply device of claim 1, wherein a second of the switching control circuits comprises a second switch for turning off the second switching element and a second time constant circuit controlling the second switching element so that the second switching element is turned off by the second switch after a predetermined period of time has passed from the generation of the voltage substantially proportional to the voltage of the primary winding turning on the second switching element in the second driving winding.

5. The switching power supply device of claim 3, wherein the first switch comprises a transistor connected to a control terminal of the first switching element, and the control terminal of the transistor is connected to the first time constant circuit comprising a first impedance circuit and a charge/discharge capacitor.

6. The switching power supply device of claim 4, wherein the second switch comprises a transistor connected to a control terminal of the second switching element, and the control terminal of the transistor is connected to the first time constant circuit comprising a first impedance circuit and a charge/discharge capacitor.

7. The switching power supply device of claim 5, wherein the impedance of the first impedance circuit comprising each of the time constant circuits changes according to one of an output power level from the secondary winding and in response to an external signal.

8. The switching power supply device of claim 6, wherein the impedance of the first impedance circuit comprising each of the time constant circuits changes according to one of an output power level from the secondary winding and in response to an external signal.

9. The switching power supply device of claim 1, further comprising a second impedance circuit including a resistor, the second impedance circuit being connected at least one of across the series capacitor of the series circuit and across the series circuit to apply an input voltage to the first switching circuit via the second impedance circuit.

10. The switching power supply device of claim 9, further comprising a third impedance circuit including a resistor to divide an input voltage applied to the first switching circuit via the second impedance circuit and apply a divided voltage to the control terminal of the first switching element to start a self-excited oscillation.

11. The switching power supply device of claim 1, further comprising an output side capacitor connected in parallel to the rectifying element. a capacitive impedance value of the output side capacitor being selected such that when the second switching element and the rectifying element are both turned off, the output side capacitor resonates with an inductance of the transformer, a voltage waveform across the output side capacitor thereby having a waveform substantially like a part of a sinusoidal waveform, rising from zero voltage or falling to zero voltage.

12. The switching power supply device of claim 1, wherein the rectifying element is a switching element controlled by switching with a control signal.

13. The switching power supply device of claim 1, wherein the switching elements are field-effect transistors.

14. The switching power supply device of claim 1, wherein the inductance comprises at least one of a leakage inductance of the transformer and an external inductor connected in series to the primary winding, wherein the inductance resonates with the series capacitor during the OFF-period of the first switching element to allow the waveform of a current flowing through the primary winding to have a waveform substantially like a part of a sinusoidal waveform.

15. The switching power supply device of claim 1, wherein a first of the switching control circuits turns on the first switching element after a voltage across the first capacitor drops to substantially zero.

16. The switching power supply device of claim 1, wherein a secondary switching control circuits turns on the second switching element after a voltage across the second capacitor drops to substantially zero.

17. The switching power supply device of claim 1, wherein the second switching control circuit turns off the second switching element when a current flowing through the second switching element is substantially zero.

18. The switching power supply device of claim 1, wherein values of the series capacitor and the inductance are selected such that after a waveform of a current flowing through the rectifying element rises from zero and reaches a peak point at which a ratio of current change is zero, the waveform again falls to the point of substantially zero current at which the rectifying element is turned off.

19. The switching power supply device of claim 1, wherein the switching control circuits control such that a ratio of an excitation quantity in a reverse direction of the transformer to an excitation quantity in a forward direction of the transformer changes according to a magnitude of a load connected to an output terminal of the rectifying and smoothing circuit.

20. The switching power supply device of claim 1, wherein the switching control circuits control such that an excitation quantity in a reverse direction of the transformer is zero or is substantially a predetermined fixed value regardless of a magnitude of a load connected to an output of the rectifying and smoothing circuit.

21. The switching power supply device of claim 1, wherein one of the switching control circuits sets the ON-time of the first switching element to be at least a minimum value to perform switching even in a state in which a load connected to an output of the rectifying and smoothing circuit is short-circuited.

* * * * *